United States Patent
Marcus

(10) Patent No.: US 9,026,700 B2
(45) Date of Patent: May 5, 2015

(54) EXTERNAL DESKTOP AGENT FOR SECURE NETWORKS

(75) Inventor: Robert Marcus, Lafayette, CA (US)

(73) Assignee: RGB Spectrum, Alameda, CA (US)

( * ) Notice: Subject to any disclaimer, the term of this patent is extended or adjusted under 35 U.S.C. 154(b) by 0 days.

(21) Appl. No.: 13/185,360

(22) Filed: Jul. 18, 2011

(65) Prior Publication Data

US 2013/0024584 A1    Jan. 24, 2013

(51) Int. Cl.
*G06F 13/38*    (2006.01)
*G06F 13/14*    (2006.01)

(52) U.S. Cl.
CPC ..................................... *G06F 13/14* (2013.01)

(58) Field of Classification Search
CPC ..... G06F 3/0601; G06F 3/038; G06F 13/385; G01G 19/005
USPC ................................................ 710/29, 62, 26
See application file for complete search history.

(56) References Cited

U.S. PATENT DOCUMENTS

| | | | |
|---|---|---|---|
| 2002/0149617 A1* | 10/2002 | Becker ........................... | 345/751 |
| 2003/0018975 A1* | 1/2003 | Stone ............................. | 725/105 |
| 2003/0065407 A1* | 4/2003 | Johnson et al. ................. | 700/19 |
| 2004/0152357 A1* | 8/2004 | Sivertsen ....................... | 439/502 |
| 2005/0175031 A1* | 8/2005 | Harley ........................... | 370/466 |
| 2005/0246433 A1* | 11/2005 | Carrigan et al. .............. | 709/223 |
| 2006/0039389 A1* | 2/2006 | Burger et al. ................. | 370/401 |
| 2009/0253304 A1* | 10/2009 | Chen et al. .................... | 439/628 |
| 2012/0161705 A1* | 6/2012 | Huang ........................... | 320/115 |

FOREIGN PATENT DOCUMENTS

WO    WO 2010020991 A2 *    2/2010

OTHER PUBLICATIONS

"ManageEngine Desktop Central: Admin Guide", Zoho Corporation, 2010, Retrieved from the Internet: < http://www.manageengine.es/fileadmin/ficheros/docs/DesktopCentral/desktop-central-admin-guide.pdf>, 115 pgs.
"XenDesktop 5.6 Feature Pack 1, Remote PC Reference Architecture", Citrix Consulting: White Paper, Retrieved from the Internet: < http://support.citrix.com/servlet/KbServlet/download/32358-102-691329/Remote%20PC%20-%20Reference%20Architecture.pdf>, Accessed on May 31, 2013, 9 pgs.

* cited by examiner

*Primary Examiner* — Farley Abad
(74) *Attorney, Agent, or Firm* — Kwan & Olynick LLP

(57) ABSTRACT

Methods and apparatus are provided for externally managing control target devices such as computer systems, cameras, recorders, etc., in an effective and secure manner. In particular examples, an external desktop agent is connected to a computer system. Remote desktop agent software need not be installed on the computer system. The external desktop agent receives commands such as keyboard and mouse commands from a control computer over a mechanism such as a bi-directional network. To provide security, the external desktop agent does not directly connect to the computer system over an interface such as universal serial bus (USB) but instead provides a PS/2 interface that connects to the computer system through a standard PS/2 to USB adapter. PS/2 does not allow bi-directional command signaling and does not provide file level access to potentially sensitive computer system data.

20 Claims, 5 Drawing Sheets

EXTERNAL DESKTOP AGENT FOR SECURE NETWORKS

TECHNICAL FIELD

The present disclosure relates to an external desktop agent for secure networks.

DESCRIPTION OF RELATED ART

Remote desktop agent software provides control computers with access to applications, data, and services on remote devices. Remote desktop agent software can be installed on remote computers and the software grants network access to the remote computers. Access may include the ability to manipulate and copy data files, send email messages, control output images and video, manage applications and services, etc.

Although remote desktop agent software provides an effective mechanism for managing and manipulating remote computer systems, security associated with remote desktop agent software is limited. Consequently, it is desirable to provide improved mechanisms for providing a control computer with access to a remote computer.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
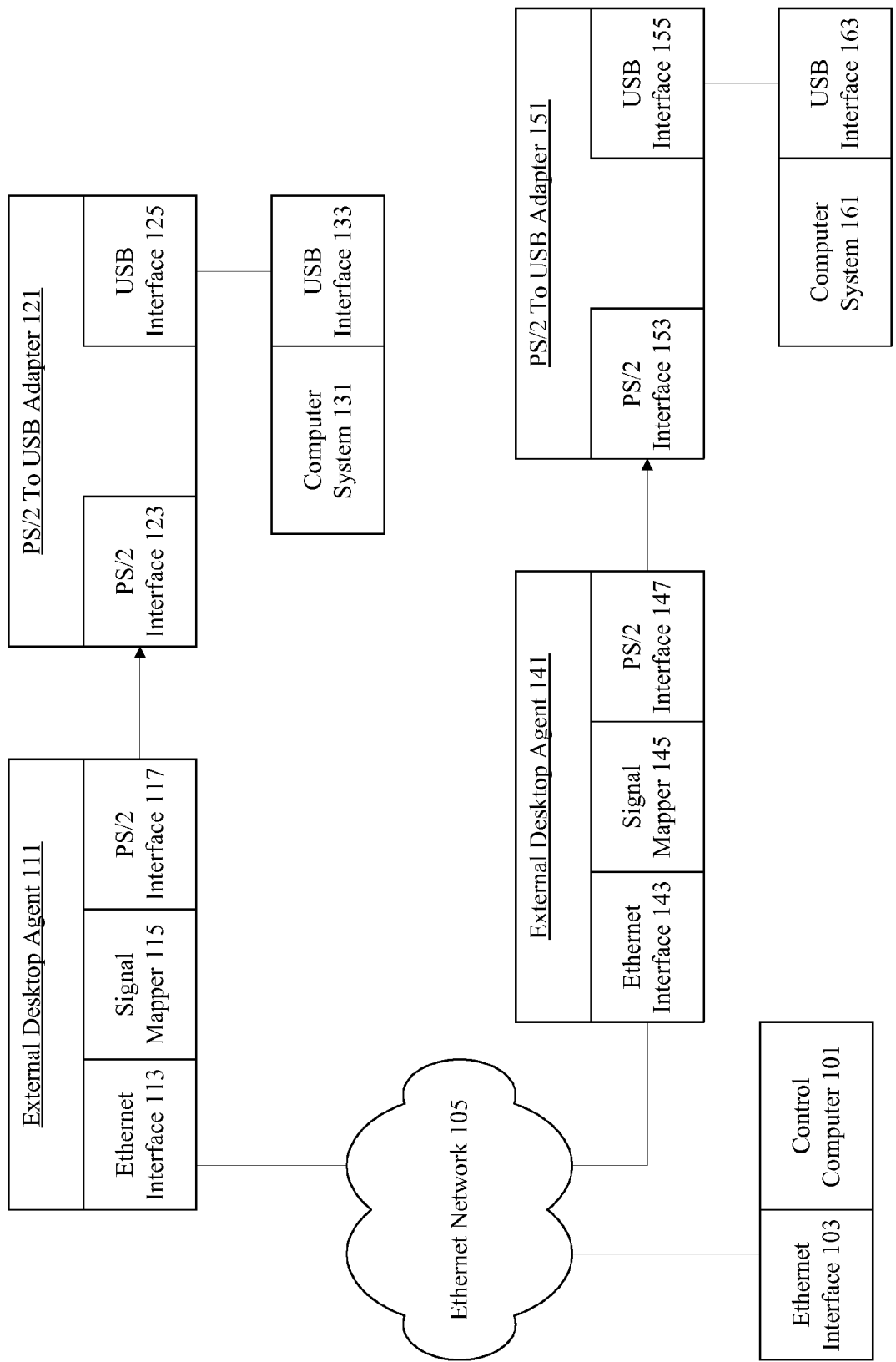
FIG. 1 is a diagrammatic representation showing a system using an external desktop agent.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular interfaces and network protocols. However, it should be noted that the techniques and mechanisms of the present invention can be used with a variety of interfaces and network protocols. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Methods and apparatus are provided for externally managing control target devices such as computer systems, cameras, recorders, etc., in an effective and secure manner. In particular examples, an external desktop agent is connected to a computer system. Remote desktop agent software need not be installed on the computer system. The external desktop agent receives commands such as keyboard and mouse commands from a control computer over a mechanism such as a bi-directional network. To provide security, the external desktop agent does not directly connect to the computer system over an interface such as universal serial bus (USB) but instead provides a PS/2 interface that connects to a control target device such as a computer system through a standard PS/2 to USB adapter. PS/2 does not allow bi-directional command signaling and does not provide file level access to potentially sensitive computer system data.

Particular Embodiments

Remote desktop agent software provides a convenient mechanism for control computers to access control target devices such as computer systems, cameras, and recorders over a network. According to various embodiments, remote desktop agent software is installed on target computer systems and grants access to control computers to manipulate files, control video and image output, send and retrieve messages, transfer data, etc. In many instances, the control computer can have complete control over the computer system once remote desktop agent software has been installed and access has been granted.

In many implementations, access is very selectively granted to a small set of administrators and control computers and access is closely monitored. Access may be granted over secured network tunnels and transmissions to and from the computer system can be fully encrypted. Remote desktop agent software can also be thoroughly checked for viruses, spyware, malware, and other embedded code that could compromise computer system security and stability. Nonetheless, remote desktop agent software still has known security flaws.

For example, remote desktop agent software may provide an outside administrator with access to sensitive files on the computer system. With direct network access to the computer system through remote desktop agent software, an administrator could surreptitiously retrieve vast amounts of data in a relatively short period of time. Even if a network is secured, remote desktop agent software accessed over bi-directional medium could be used to provide at least some limited information about the contents of a computer system.

Simple installation of remote desktop agent software may also significantly compromise system security. Many highly secured environments do not readily allow installation of third party software on their computer systems. Any third party software is required to undergo extensive and rigorous testing and scrutiny to prevent the introduction of system threats whether malicious or unintentional. System threats may include viruses, malware, spyware, trojan horses, backdoors, rootkits, as well as any poorly written code that could cause system faults or instability. Some highly secured environments may not want any third party software installed and disallow use of any remote desktop agents entirely.

Without remote desktop agent software, keyboard/video/mouse KVM control can still be provided by using a universal serial bus (USB) input. A control computer can send KVM input to the computer system over a network such as an Ethernet network to a USB input using a network to USB adapter. However, USB is inherently an open mechanism used to facilitate bi-directional data transfer. USB allows bidirectional command signaling and bidirectional file transfer. A control computer could obtain file level access to a system through a USB port. Some secure system environments attempt to severely restrict use of USB at a BIOS level.

Nonetheless, remote access and/or KVM access to devices such as computer systems is desirable in many environments. For example, many display systems such as multiviewer and video wall systems display video from a number of devices. These devices may include computer systems, video recorders, cameras, etc. These devices may each with their own processors, memory, storage, interfaces, interfaces, and human operators, but it is typically desirable for some of these devices to be controlled remotely or for control to be centralized at a limited number of control computers.

In particular embodiments, a control room environment allows images and videos from dozens of different computer systems to be manipulated by administrators at two control computers and displayed on a video wall. In order to allow control of dozens of different computer systems by two control computers, control through remote desktop agent software or USB KVM is typically required. However, the security and stability threats that may result from installation of remote desktop agent software or use of USB KVM on computer systems limits adoption and desirability of these mechanisms.

Consequently, the techniques and mechanisms of the present invention provide a KVM solution that does not require installation of any software on a computer system and prevents bi-directional file level access to potentially sensitive information. According to various embodiments, keyboard and mouse signals may be provided by a control computer over a network such as an Ethernet network to an external desktop agent. According to various embodiments, an external, inline interface that converts a bi-directional control and data interface to a uni-directional control interface is referred to herein as an external desktop agent.

In particular embodiments, the external desktops agent converts the keyboard and mouse signals to PS/2 inputs provided on a PS/2 interface. It is recognized that many motherboards and devices do not support PS/2 interfaces. Consequently, a conventional PS/2 to USB adapter can be used to transmit PS/2 signals over a USB interface onto the computer system. The PS/2 interface acts as a unidirectional valve preventing bi-directional file level access to a computer system. Although PS/2 is described, it should be noted that other unidirectional valves can be used as well. For example, a parallel printer port, a firmware enforced unidirectional USB interface, or other proprietary interfaces can be used to assure only unidirectional signaling. According to various embodiments, a control computer can manipulate a computer system using the external desktop agent to display images and video on a video wall. However, the control computer cannot readily retrieve file data from the computer system. Data cannot be transmitted from the computer system to the control computer through the uni-directional PS/2 valve. Computer system operation and integrity is not compromised with the installation of software or bi-directional interface access.

According to various embodiments, the computer system may be connected to a secure network such as a military, government, or enterprise network. The computer system can be connected to multiple networks including more secure and less secure networks. Third party devices, software, and/or access to a more secure network may be prohibited. An external desktop agent allows control of the computer system over a less secure network without compromising the secure network, without installing third party software on the computer system, and without providing file level access to the computer system. In particular embodiments, the external desktop agent is connected to a control computer over a network that may not have a high level of security but nonetheless allows the communication of PS/2 signals to the computer system. A PS/2 interface associated with the external desktop agent prevents bi-directional access to the computer system while allowing keyboard, mouse, and other input device signals to reach the computer system.

According to various embodiments, the external desktop agent can be used in a variety of systems including any systems requiring secured KVM access. A control computer can access numerous devices through a network to PS/2 to USB interface. It should be noted that PS/2 supports not only keyboards and mice but also keypads, touchpads, trackballs, multitouch surfaces, etc. Video from various devices can be controlled and provided over a network or a video interface.

The techniques of the present invention also recognize that video provided over a network often has poor quality. Video signals may be sent over video interfaces such as a digital video interface (DVI), display port, a high definition media interface (HDMI), etc. A hybrid network using a combination of direct video connections and a control network provides high bandwidth throughput for video and flexible data transfers for keyboard and mouse input signals. Displayed visuals are real time and synchronized with keyboard and mouse input. It should be noted that the techniques of the present invention can be used with a hybrid network as well as a conventional network.

FIG. 1 illustrates one example of an external desktop agent. According to various embodiments, an external desktop agent provides a control computer with access to a computer system without requiring installation of any remote desktop agent software or accessing bi-directional, open interfaces such as USB. According to various embodiments, a control computer 101 is a control computer system having an Ethernet interface 103. The control computer 101 may need to access one or more control target devices such as computer system 131 or computer system 161. According to various embodiments, it may be desirable to allow limited access to computer systems 131 and 161, but not in a manner that would risk exposure of sensitive data or applications residing on computer system 131 or computer 161 or any associated secured networks. The control computer 101 may be a system with an Ethernet interface 103 to Ethernet network 105. It should be noted that a variety of networks and network protocols may be used. External desktop agents 111 and 141 are connected to the Ethernet network 105.

The external desktop agent 111 includes Ethernet interface 113. According to various embodiments, the external desktop agent 111 includes a signal mapper 115 that takes commands and signals received over the Ethernet interface 113 and converts them into PS/2 commands. In some instances, signals and commands are extracted from Ethernet packets received over Ethernet interface 113. PS/2 commands are sent through PS/2 interface 117 included in external desktop agent 111 to a PS/2 to USB adapter 121 that includes a PS/2 interface 123 and a USB interface 125. The PS/2 to USB adapter 121 may be a standard PS/2 to USB adapter that the computer system 131 owner selects for security purposes. According to various embodiments, both the external desktop agent 111 and the PS/2 to USB adapter 121 operate as uni-directional valves that prevent information on computer system 131 from being transmitted back out through USB interface 133

The external desktop agent 141 includes Ethernet interface 143. According to various embodiments, the external desktop agent 141 includes a signal mapper 145 that takes commands and signals received over the Ethernet interface 143 and converts them into PS/2 commands. In some instances, signals and commands are extracted from Ethernet packets received over Ethernet interface 143. PS/2 commands are sent through PS/2 interface 147 included in external desktop agent 141 to a PS/2 to USB adapter 151 that includes a PS/2 interface 153 and a USB interface 155. The PS/2 to USB adapter 151 may be a standard PS/2 to USB adapter that the computer system 161 owner selects for security purposes. According to various embodiments, both the external desktop agent 141 and the PS/2 to USB adapter 151 operate as uni-directional valves that prevent information on computer system 161 from being transmitted back out through USB interface 163.

Figure 2:
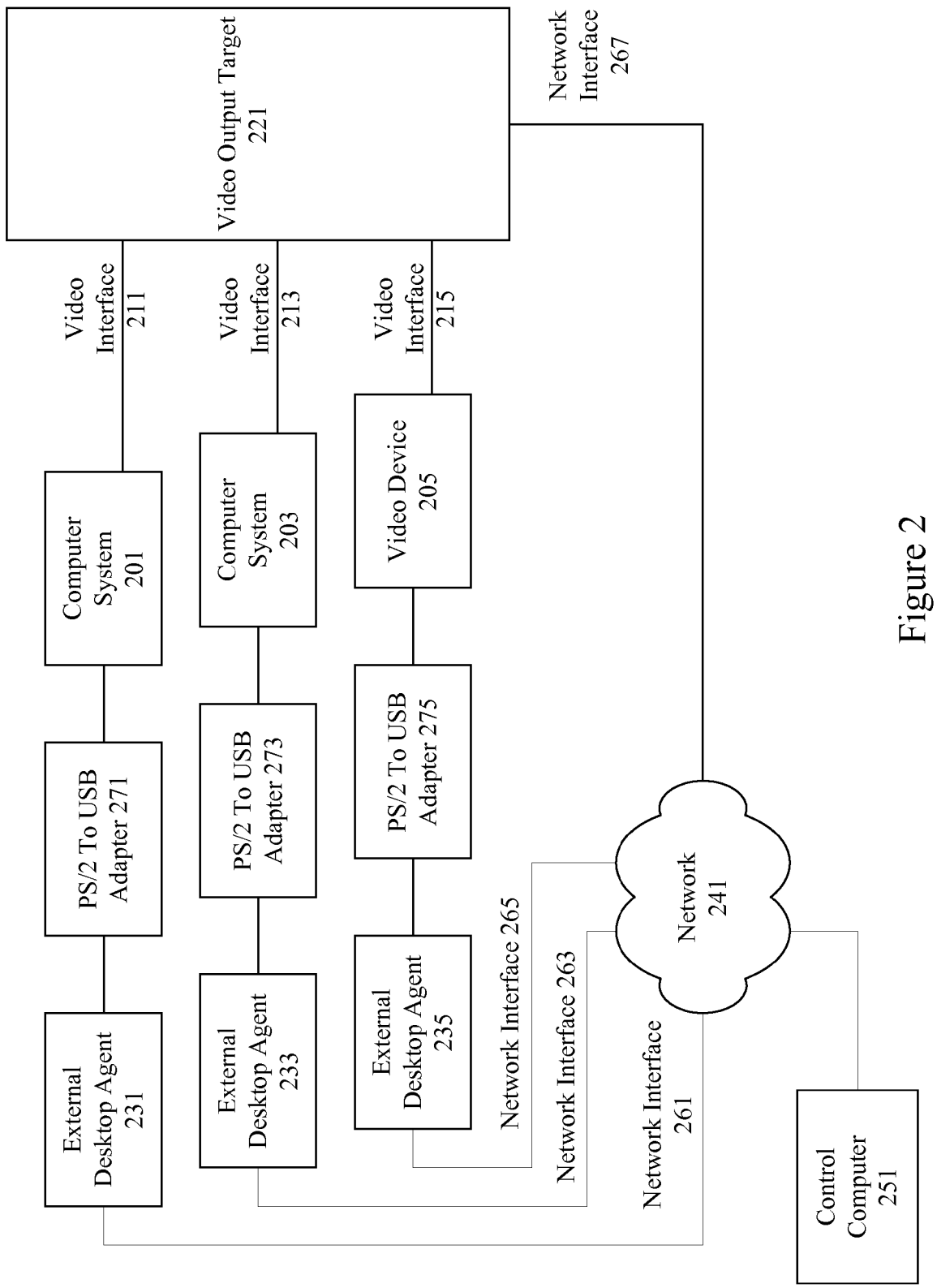
FIG. 2 is a diagrammatic representation showing a video output target.

FIG. 2 illustrates one example of a system that can include an external desktop agent. An administrator on a control computer 251 may use an input interface such as a keyboard, mouse, touchpad, keypad, touchscreen, etc. as well as a network interface connected to a network 241. In particular embodiments, the network can be one of a variety of different networks, such as Ethernet, wireless, serial, or Bluetooth.

According to various embodiments, the network 241 is connected through network interfaces 261, 263, and 265 to external desktop agents 231, 233, and 235 respectively. According to various embodiments, the external desktop agents 231 receive commands and signals included in Ethernet packets and convert them into PS/2 signals. In particular embodiments, the PS/2 signals are converted through USB adapters 271, 273, and 275 to USB signals. According to various embodiments, the PS/2 to USB adapters 271, 273, and 275 are widely available, standard components. In systems, owners of control target devices may want to select their own PS/2 to USB adapters to use with external desktop agents to further ensure security. The computer systems 201 and 203 and video device 205 receives keyboard and mouse input commands through USB interfaces. According to various embodiments, any device that can be manipulated using input devices such as keyboard and mice to provide to provide video can be connected to the external desktop agents 231, 233, and 235. Computer systems 201 and 203 and video device 205 may include servers, pan-tilt-zoom cameras, digital video recorders, workstations, etc.

Each computer system and video device may have a processor and memory and may or may not be connected to a keyboard and a mouse. According to various embodiments, each computer system 201 and 203 and video device 205 are connected through video interfaces 211, 213, and 215 to a video output target 221. According to various embodiments, the video interfaces 211, 213, and 215 are Digital Visual Interface (DVI) or High Definition Multimedia Interface (HDMI) connections. In particular embodiments, the video interfaces 211, 213, and 215 are operable to carry video in a much more effective manner than a network 241 could carry video.

The video output target 221 may be a multiviewer, video wall, video processor, control station, display, etc. It is also possible that the video output target 221 receives some video over the network 241 as well. According to particular embodiments, the video output target performs processing that involves receiving video, performing modification to the video, and/or selecting video from the computer systems 201 and 203 and video device 205. The video output target may also receive input signals from the control computer 251 over the network 241.

According to various embodiments, the video output target 221 is a media aggregation device such as a MediaWall® or SuperView® Processor available from RGB Spectrum of Alameda, Calif. In particular embodiments, the video output target 221 is a specially configured system or appliance configured to receive video over video inputs and control signals over a network. In some examples, the system is a specially configured computer system based device.

According to various embodiments, the control computer may display a plurality of labeled rectangles, reduced resolution windows, etc., each associated with a device.

All communications within the external desktop agent system can be secure. According to various embodiments, the video interfaces are local and secure. The network may be shared with other entities such as other personnel in an enterprise environment, but communications over the control network can be secured using encryption. No third party software needs to be installed on computer system 201 or 203 or on video device 205. The external desktop agent 231, 233, and 235 and the PS/2 to USB adapters 271, 273, and 275 prevent bi-directional file transfer and limit communications to uni-directional keyboard and mouse control inputs.

It should be noted that although the components of the external desktop agent system are shown as separate entities, it will be recognized that some entities can be combined with others.

Figure 3:
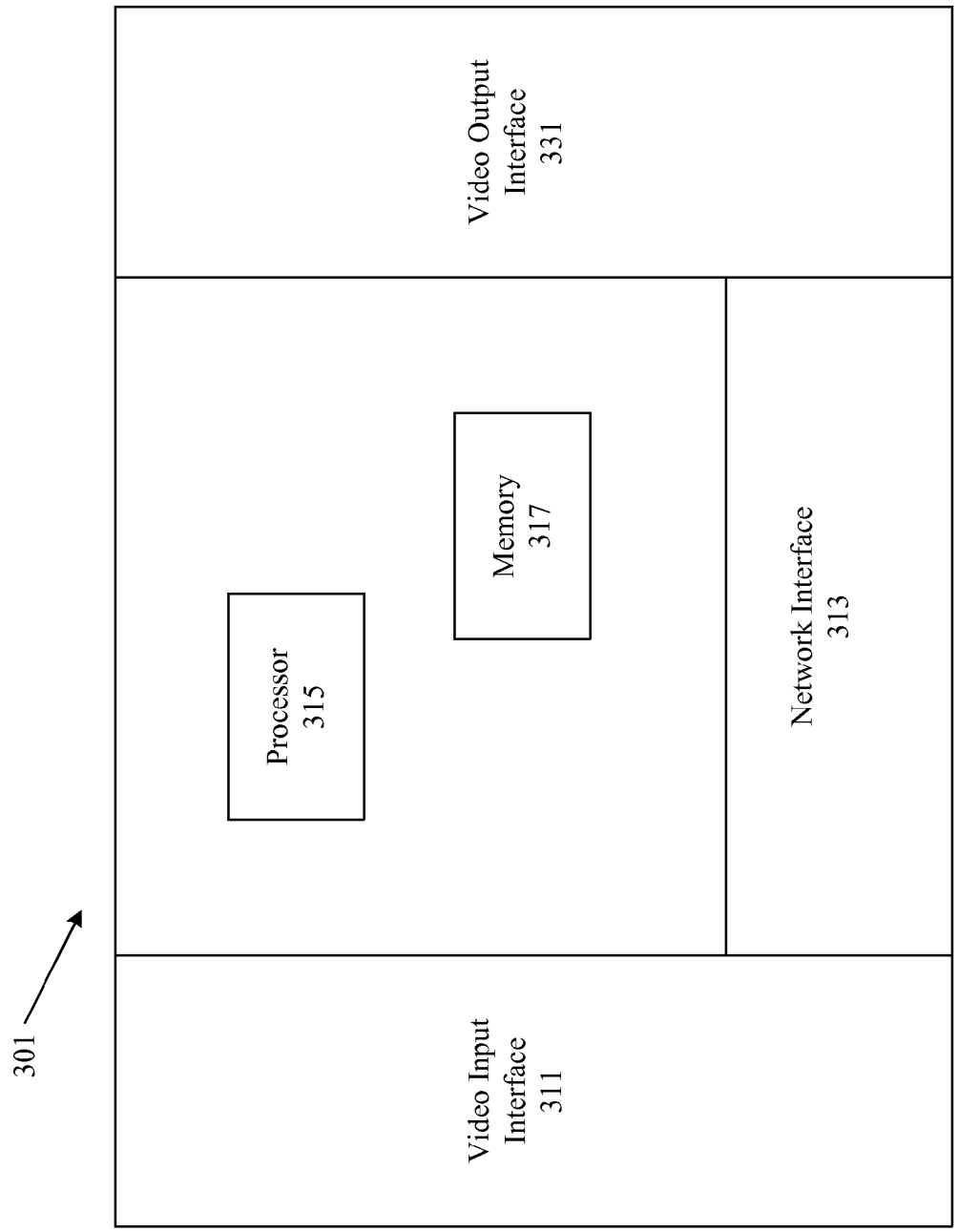
FIG. 3 is a diagrammatic representation showing a video processor.

FIG. 3 is a diagrammatic representation showing one example of a video output target such as a video processor. According to various embodiments, the video output target is a video processor 301 specially configured appliance operable to receive video input and display video output in various windows located on a display system. In particular embodiments, the video processor is a media aggregation device such as a MediaWall® or SuperView® Processor available from RGB Spectrum of Alameda, Calif. In other particular embodiments, the video processor is a computer system, server, board, device or chip. According to various embodiments, video processor 301 includes a processor 315, memory 317, network interface 313, video input interface 311, and video output interface 331.

In particular embodiments, the video input interface 311 is a collection of Digital Video Interfaces (DVI) that receives video over video connections from source computers or source video sources. Video output interface 331 sends video output over one or more lines to a display system. The video output interface 331 may also be a collection of Digital Video Interfaces (DVI). Other types of interfaces such as High Definition Multimedia Interface (HDMI) can also be used. Network interface 313 receives keyboard and mouse signals from a control computer. According to various embodiments, the network interface 313 is an enterprise network used by a variety of computers outside of the integrated control system with keyboard video and mouse (KvM). The network interface 313 may connect the video processor 301 to an IP network, wireless network, etc.

According to various embodiments, the video processor is a real time video/data wall processor that supports a display system, including one or more projectors, cubes, monitors, or displays. Any single display or multiple display grouping showing video data from multiple computers systems is referred to herein as a display system. According to various embodiments, the video processor works with any tiled display, and has adjustments to compensate for the bezel between panels or cubes, as well as overlapped outputs to support edge blending on a continuous screen. In particular embodiments, the video processor can provide multiple graphics and video windows on multiple screens. For examples, eight graphics and eight video signals can be displayed in sixteen windows over six screens. Some examples of video graphics signals include Red Green Blue (RGB), Digital Video Interface (DVI), and High Definition Television (HDTV). In particular embodiments, video inputs may be composite, component, or S-Video.

Figure 4:
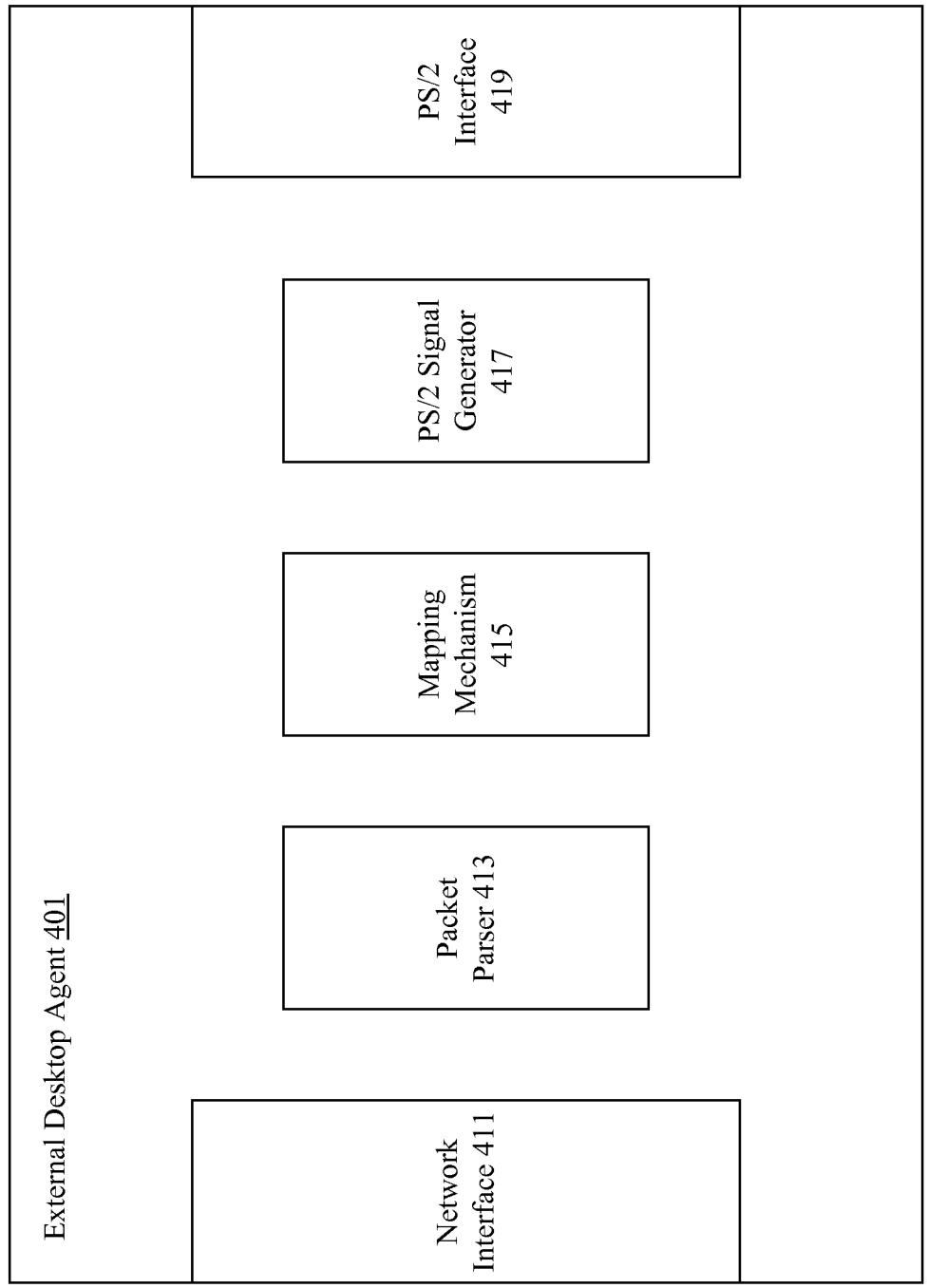
FIG. 4 is a diagrammatic representation showing an external desktop agent.

FIG. 4 is a diagrammatic representation showing one example of an external desktop agent. According to various embodiments, the external desktop agent 401 includes a network interface 411. The network interface 411 may be an Ethernet network interface, a wireless network interface, a Bluetooth interface, etc. A packet parser 413 takes packets received over the network interface 411 and extracts commands and signals from the packets. The commands and signals may originate from an administrator at a control computer connected to a network. According to various embodiments, a mapping mechanism 415 or translation mechanism converts the commands and signals into PS/2 signals. In some instances, little or no translation is necessary. In other examples, complex mapping schemes may be required. A PS/2 signal generator 417 then outputs PS/2 signals out onto a PS/2 interface 419. According to various embodiments, a PS/2 interface 419 provides a convenient mechanism for assuring that access to a computer system is limited. Interfaces like USB or eSATA allow bi-directional file level access to a computer system or device. In many applications, bi-directional file level access is not acceptable on computer systems having sensitive data or applications.

Figure 5:
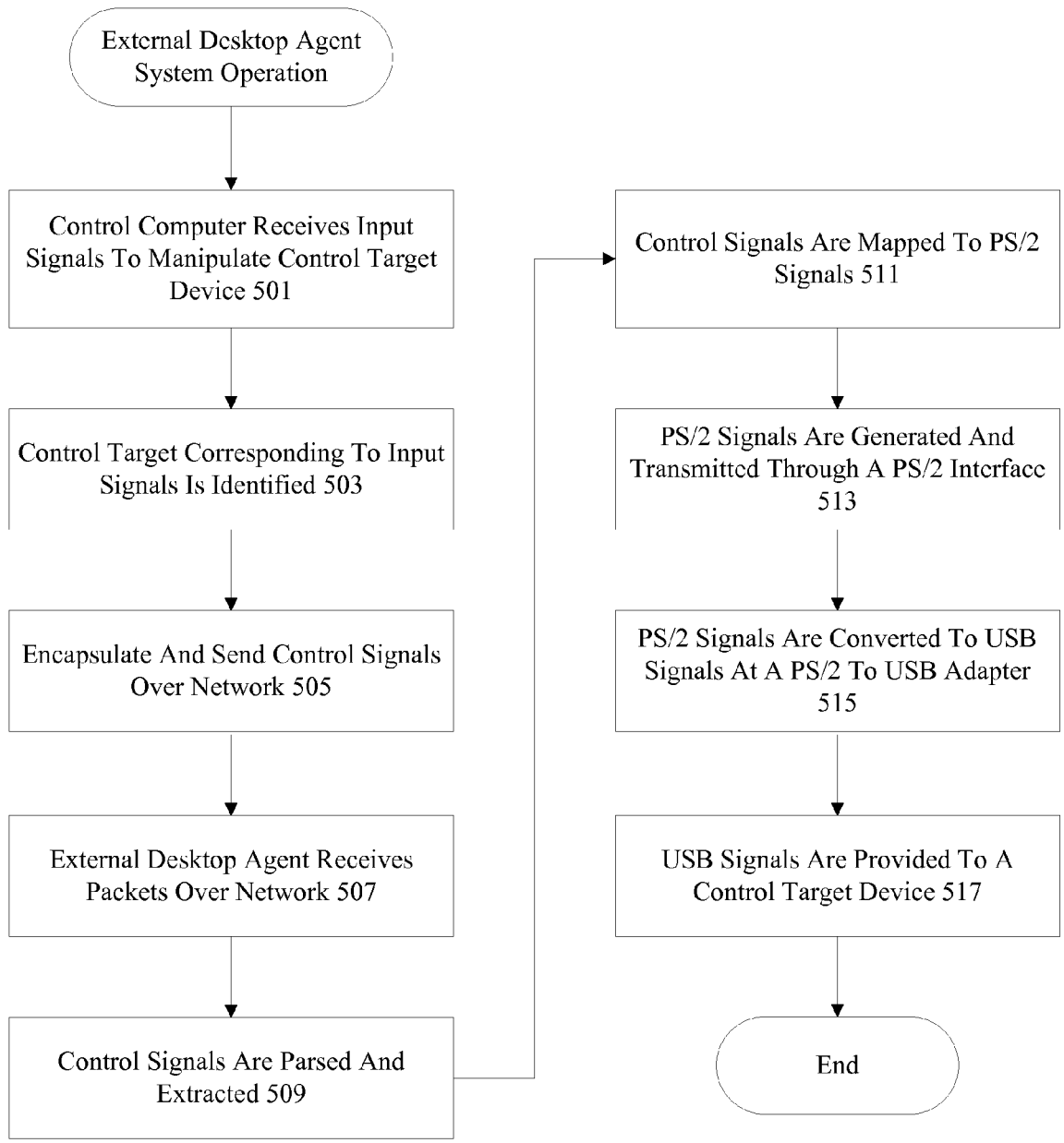
FIG. 5 is a process flow diagram showing a technique for using an external desktop agent.

FIG. 5 is a flow process diagram showing one technique for managing computer systems through an external desktop agent. According to various embodiments, an administrator at a control computer performs input interface operations at 501 to manipulate control target devices such as computer systems, pan-tilt-zoom cameras, digital video recorders, etc. In particular examples, the administrator may be manipulating a control computer to change a graphic displayed on a video wall. The control target is identified at 503. Control signals are encapsulated and sent over a network interface at 505. According to various embodiments, an external desktop agent associated with a control target device receives packets over the network interface at 507.

The network interface may be an Ethernet network interface, a wireless interface, a Bluetooth interface, etc. At 509, control signals are parsed and extracted from the received packets. At 511, the control signals are mapped to appropriate PS/2 commands. In some instances, extensive mapping is not necessary. At 513, PS/2 signals are generated and transmitted through a PS/2 interface. At 515, PS/2 signals are converted at a PS/2 to USB adapter to USB signals. A variety of PS/2 to USB adapters are available. USB input signals are provided to a control target device such as a computer system at 517.

By using an external desktop agent and a PS/2 adapter, no software needs to be installed at a control target. A computer system with sensitive data need not risk running malicious or unstable third party software. Furthermore, PS/2 does not provide bi-directional access to the computer system and instead allows only uni-directional signaling. Unlike a USB interface, files cannot be extracted through a PS/2 interface.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A system, comprising:
a control computer;
an external desktop agent connected to the control computer through a first network, the external desktop agent including a network interface configured to receive a first control message including control information in a first signal format via the first network, a signal mapping mechanism configured to map the control information from the first signal format to a second signal format, a signal generator configured to generate a second control message including the control information in the second signal format, and a signal interface configured to transmit the second control message;
a signal adapter connected to the external desktop agent, the signal adapter configured to receive the second control message, to generate a third control message including the control information in a third signal format, and to transmit the third control message; and
a control target device including a computer system connected with the signal adapter, wherein the control computer is operable to manage the control target device through the external desktop agent and signal adapter, wherein the signal adapter is physically configured to transmit only uni-directional communication from the external desktop agent to the control target device, and wherein all commands transmitted between the control computer and the control target device are transmitted via the external desktop agent and the signal adapter.

2. The system of claim 1, wherein the signal mapping mechanism takes commands and signals received over the network interface and converts them into Personal System/2 (PS/2) commands.

3. The system of claim 1, wherein the signal adapter is a Personal System/2 (PS/2) commands to Universal Serial Bus (USB) converter.

4. The system of claim 1, wherein the external desktop agent operate as a uni-directional valve allowing only uni-directional signaling.

5. The system of claim 1, wherein the control target device is connected to a video output target.

6. The system of claim 1, wherein the control target device is connected to a video processor associated with a video wall.

7. The system of claim 1, wherein the control target device is connected to a second secure network separate from the first network.

8. The system of claim 1, wherein the control computer is operable to manage the computer system without the installation of remote desktop agent software on the computer system.

9. The system of claim 1, wherein the control target device is connected to a video output target through a video interface.

10. The system of claim 9, wherein the video interface is a Digital Video Interface (DVI).

11. A device comprising:
a network interface configured to receive from a control computer via a network a first control message including control information in a first signal format;
a signal mapping mechanism configured to map the control information from the first signal format to a second signal format;
a signal generator configured to generate a second control message including the control information in the second signal format;
a signal interface configured to transmit the second control message; and
a signal adapter configured to receive the second control message and to transmit to a control target device including a computer system a third control message including the control information in a third signal format, the signal adapter physically configured to transmit only uni-directional communication from the external desktop agent to the control target device, wherein the control computer is operable to manage the control target device through the external desktop agent and signal adapter, and wherein all commands transmitted between the control computer and the control target device are transmitted via the external desktop agent and the signal adapter.

12. The device of claim 11, wherein the control target device is a camera or recorder.

13. The device of claim 11, wherein the control target device is a computer system.

14. The device of claim 11, wherein the control target device is connected to a video output target.

15. The device of claim 11, wherein the control target device is connected to a video processor associated with a video wall.

16. The device of claim 11, wherein the control target device is connected to a second secure network separate from the first network.

17. The device of claim 11, wherein the control computer is operable to manage the control target device without the installation of remote desktop agent software on the control target device.

18. A method comprising:
receiving a first control message from a control computer, the first control message received at a network interface associated with an external desktop agent, the first control message including control information in a first signal format;
mapping the control information from the first signal format to a second signal format;
transmitting a second control message from the external desktop agent to a signal adapter, the second control message including the control information in the second signal format; and
transmitting a third control message from the signal adapter to a control target device including a computer system, the third control message including the control information in a third signal format, wherein the control computer is operable to manage the control target device through the external desktop agent and signal adapter, wherein the signal adapter is physically configured to transmit only uni-directional communication from the external desktop agent to the control target device, and wherein all commands transmitted between the control computer and the control target device are transmitted via the external desktop agent and the signal adapter.

19. The method of claim 18, wherein the first signal format comprises a network packet protocol and wherein the second signal format comprises a PS/2 protocol.

20. The method of claim 18, wherein the signal adapter is configured to convert Personal System/2 (PS/2) commands to Universal Serial Bus (USB) commands.

* * * * *